UNITED STATES PATENT OFFICE.

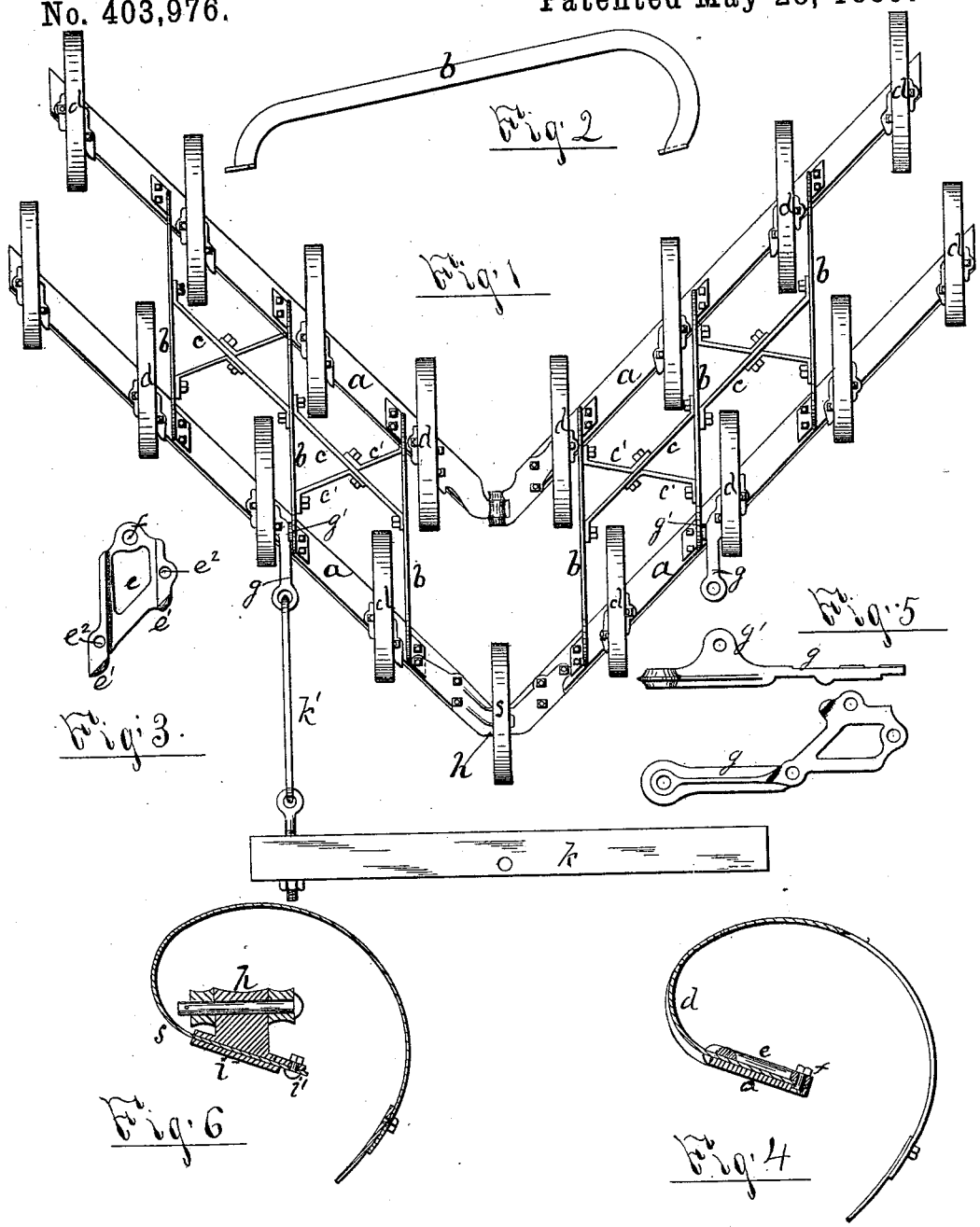

HARRY WIARD, OF SYRACUSE, NEW YORK.

SPRING-TOOTHED HARROW.

SPECIFICATION forming part of Letters Patent No. 403,976, dated May 28, 1889.

Application filed January 16, 1888. Serial No. 260,800. (No model.)

*To all whom it may concern:*

Be it known that I, HARRY WIARD, of Syracuse, Onondaga county, State of New York, have invented certain new and useful Improvements in the Construction of Spring-Toothed Harrows, of which the following is a specification.

My invention consists in the construction, modification, and arrangement of parts, by which greater strength, stability, and cheapness are attained, together with a better and more perfect action of the implement than has hitherto been effected.

Most of the parts comprising this harrow have been before used, either separately or united, and to these no claim is made; but the particular construction, modification, and position of certain of the parts, as herein described, render the harrow better in operation, cheaper, and more perfect than similar structures now in use. These objects I attain by the devices illustrated in the accompanying drawings, in which—

Figure 1 is a plan of the harrow complete, ready for use. Fig. 2 is an elevation of the connecting-bars $b$. Fig. 3 is a clip to secure the spring-teeth to the bar $a$. Fig. 4 is a spring-tooth attached to the bar $a$. Fig. 5 is a clip with draft-arm and eye. Fig. 6 is a section of forward center joint, showing the tooth attachment with the hinge.

Like parts are designated by the same letters of reference.

This harrow is generally composed of two tooth-bars, $a$, on each wing. They are placed parallel and the wings are jointed together at the center, from which they incline backward on each side. (See Fig. 1.) The front center joint is composed of two leaves that are bolted to the ends of the tooth-bars $a$ at their junction on each side. These are joined by a rule-joint, $h$, having a pintle through it, on which the wings turn at the center line of draft of the harrow and exactly on the line of the joint. Just below the joint a socket or recess, $i$, is formed on one leaf of the hinge, as shown at Fig. 6, into which the shank of the center spring-tooth, $s$, is put, filling the recess, by which it is held steady. At the rear of this socket there is a bolt-hole to receive a bolt, $i'$, passing through it, and a hole in the end of the spring-tooth, by which the tooth is firmly held in place.

The parallel wing-bars $a$ not only incline backward from the center joint, but their front edges are elevated, so as to readily slide over the ground. They are securely held in position by connecting bars or braces $b$, that extend from the front bar $a$ to the rear one, parallel thereto in the line of draft. These braces $b$ are elevated above the tooth-bars $a$, and to further prevent their clogging their front ends are curved downward in a line corresponding with the curve of the spring-teeth, so as to leave a similar space beneath them at that point. Their lower ends are bolted to the tooth-bars $a$. The rear ends of these brace-bars are lowered, so as to approach nearer the ground and are curved downward to the rear bar $a$, to which they are bolted. This form of bar is shown at Fig. 2, and affords an unobstructed clearance way in front and rear for the obstructions that generally clog the ordinary harrow in use. This matter of clearance is a very important element in working the spring-tooth harrow, which has not heretofore been satisfactorily attained. The parallel brace-bars $b$ are held in position by cross-braces $c$, of rolled metal, extending from one to the other. They consist of a straight bar, $e$, extending angularly across from one bar $b$ to another, to which the ends are bolted. These are crossed by two other shorter braces, $c'$, bolted to the center of $c$ and at their other ends secured to the brace-bars $b$, thus forming a strong cross-bracing, easily made and applied. The teeth $d$, affixed to the bars $a$, are curved into spiral form; but the shanks, instead of being formed, as usual, in the same plane as the rest of the tooth, like those heretofore made, that require angular shims or seats between them and the tooth-bar, are twisted so as to fit the inclination of bar $a$, on which they rest. This gives the shank greater stiffness and strength and a firmer seat on the bar, with which it comes directly in contact. This is seen in Fig. 4, where they are held onto the bar by a clip, $e$, that fits over the tooth, having a recess in its under side to receive the tooth, and two lugs, $e'$, (See Fig. 3,) that project down over the front edge of bar $a$ to steady it in place. A bolt-hole, $e^2$, on each side of the recess near the front of the clip receives a bolt that passes through said holes and the bar *a* to securely unite them. A third hole, *f*, at the rear end of the clip receives a bolt, that also passes through a hole in the end of the shank of the tooth and firmly holds it in place, as seen in Fig. 4. By this method of securing the spring-tooth in place it has but one perforation at its point of attachment, and that at a place where it is not weakened thereby, while the stability of its connection is rendered more complete than by the usual fixtures. There is a clip on each side affixed to the front bar *a*, holding a tooth like those last described; but in addition to that part it has a forwardly-projecting arm, *g*, with an eye at its end, as seen detached at Fig. 5, the rear part of which arm has a projection, *g'*, on it, through which there is a bolt-hole horizontally, by which it is bolted to the forward curved standard of the adjacent brace-bar *b* to strengthen its attachment. Into the eyes on these arms *g* the rod *k'*, connected with the draft-bar *k*, is hooked.

Having thus fully described the details of construction constituting my invention in spring-toothed harrows, I claim—

1. In a spring-tooth harrow having a tooth bar or bars inclined in two directions to the line of draft, the combination therewith of a spring-tooth the shank of which is twisted, as herein described, to fit the double inclination of said bar, the tooth being held securely in position by a cap without interposing anything between the bar and tooth, as set forth.

2. The clip *g*, having the arm *g'* and eye therein combined with it for connecting the draw-bar with the harrow, constructed and arranged substantially in the manner and for the purposes herein specified.

3. The combination of the arm *g'* with the standard of the connecting-bar *b* and bar *a*, as and for the purposes specified.

HARRY WIARD.

Witnesses:
J. J. GREENOUGH,
ROBT. H. ABBOTT.